United States Patent

Petri, Jr. et al.

[15] 3,686,979
[45] Aug. 29, 1972

[54] INDEX TABLE CONTROL

[72] Inventors: William Edward Petri, Jr.; Richard Joseph Froese, both of Cincinnati, Ohio

[73] Assignee: The Cincinnati Gilbert Machine Tool Company, Cincinnati, Ohio

[22] Filed: Dec. 7, 1970

[21] Appl. No.: 95,848

[52] U.S. Cl. ................74/813 C, 74/813 L, 408/71
[51] Int. Cl. ............................................B23q 21/00
[58] Field of Search....74/813 C, 826, 824, 823, 822, 74/818, 817

[56] References Cited

UNITED STATES PATENTS

| | | | |
|---|---|---|---|
| 3,031,902 | 5/1962 | Parske et al. | 74/818 |
| 2,934,978 | 5/1960 | Estabrook | 74/826 X |
| 2,949,796 | 8/1960 | Frederick et al. | 74/817 X |
| 2,366,398 | 1/1945 | Harrington | 74/822 |
| 2,900,849 | 8/1959 | Hutchens et al. | 74/826 |
| 3,094,885 | 6/1963 | Flannery et al. | 74/826 |
| 3,222,955 | 12/1965 | Ross et al. | 74/826 |

*Primary Examiner*—William F. O'Dea
*Assistant Examiner*—F. D. Shoemaker
*Attorney*—Wood, Herron & Evans

[57] ABSTRACT

An air bearing supported rotary index table for machine tools is provided with an automatic table index locking mechanism which is operable to allow the table to be moved past undesired index positions and to be stopped and locked at a desired index position. The locking mechanism is provided with time delay controls which actuate it only in response to the presence of the table at a given index position for a predetermined minimum period of time. In use, discrimination between desired and undesired index positions is achieved by movement past undesired index positions, and very slow movement near the desired index position.

40 Claims, 3 Drawing Figures

Fig. 1

INVENTORS
William E. Petri, Jr.
Richard J. Froese
BY Wood, Herron & Evans
ATTORNEYS

INDEX TABLE CONTROL

The present invention relates to machine tool index tables, and more particularly, to a novel control for a table indexing mechanism and to a novel method of controlling the indexing of such a table.

Index tables are commonly used in connection with machine tools to support workpieces during machining operations. They include a horizontal work supporting table portion which is supported by and moveable on a stationary base. These tables are characterized by means to lock the table on its base at any one of a number of precise index positions or orientations. Typically, such a table is rotatably mounted on its base and, in use, is either manually moved or power driven between different index positions. Some such tables are indexed completely by automated controls; however, the present invention is most useful primarily with tables which are indexed under the direct control of a human operator, and is especially useful with tables which an operator must move between index positions by the exertion of manual force against the table or workpiece.

Such rotatable index tables are commonly used with many machine tools such as boring mills in which a cutting tool must perform several different cutting operations, each requiring a different orientation of the tool with respect to the workpiece supported upon the table. To accommodate this need, these tables are made to be indexable to any one of at least four angular positions, spaced at 90° intervals, and in most cases, to several other positions spaced at other intervals. These tables are provided with some mechanism which is selectively operable to lock the table to its base for machining operations and to release the table from its base for positioning and indexing. One type of table suitable for this purpose is provided with a selectively operable air lift and bearing mechanism. When this bearing is actuated, the table is released from the base and supported on a cushion of air and is freely able to rotate about a vertical shaft connecting the base with the center of the table. When the air lift mechanism is deactuated, the table rests upon the base, the friction between the contacting surfaces usually being sufficient to lock the table against movement on the base. Such a table is described in U.S. Pat. No. 3,042,460 of C.E. Gilbert, Sr., et al., July 3, 1962, for Slide Bearing Construction. For high torque applications, air lift tables are also provided with additional clamping means to positionally lock the table against rotation or to increase the frictional force between the table and the base. Tables with bearing means other than the air lift type are also used; however, the preferred embodiment of the present invention provides special advantages when used with tables of the air lift type.

One basic problem encountered in the use of manually rotatable tables lies in the difficulty which the operator experiences in attempting to accurately position the table and workpiece with its large inherent mass and inertia, and then to actuate the locking mechanism to stop the table in precisely the proper index position. Furthermore, because it is necessary to lock the table at only a desired one of a large number of possible index positions through which the table must pass, selectivity of operation is essential.

Accordingly, it is a principal object of the present invention to provide an indexing control and a method of using the control so that an operator may select one of the plurality of index positions simply by moving the turret to the selected position. More particularly, it is an object of the present invention to provide a control system and method for automatically locking an index table in a desired index position without direct actuation on the part of the operator.

Accordingly, the present invention provides a control system and method for controlling an index table in such a manner that a table locking mechanism is automatically actuated by the presence of the table in only the desired index positions. The present invention is predicated upon the concept of distinguishing a desired index position from an undesired index position by the period of time during which the table is present at each index position. In such a manner, an operator can rotate the table rapidly past the undesired index positions without actuating the locking mechanism, but can rotate the table slowly in the vicinity of the desired index position to cause the locking mechanism to be actuated.

The particular advantage of the present invention is that the operator can index and lock the table while concentrating solely on the moving of the table, and he is not required to move his hands or his attention from the table in order to actuate the locking mechanism. This feature has particular advantage when used in conjunction with large boring mills in which the control panel is necessarily at some position remote from, and generally elevated above, the table and machining area. In such cases, the operator would usually be required to leave his position at the control panel and climb down to the machining level to manually urge the turret to a new index position, and then to climb back up to the control station to actuate the lock.

Other objects and advantages of the present invention will become more readily apparent from the following detailed description of the drawings illustrating one preferred form of the control system and method for controlling the indexing of an index table according to principles of the present invention in which:

Figure 1:
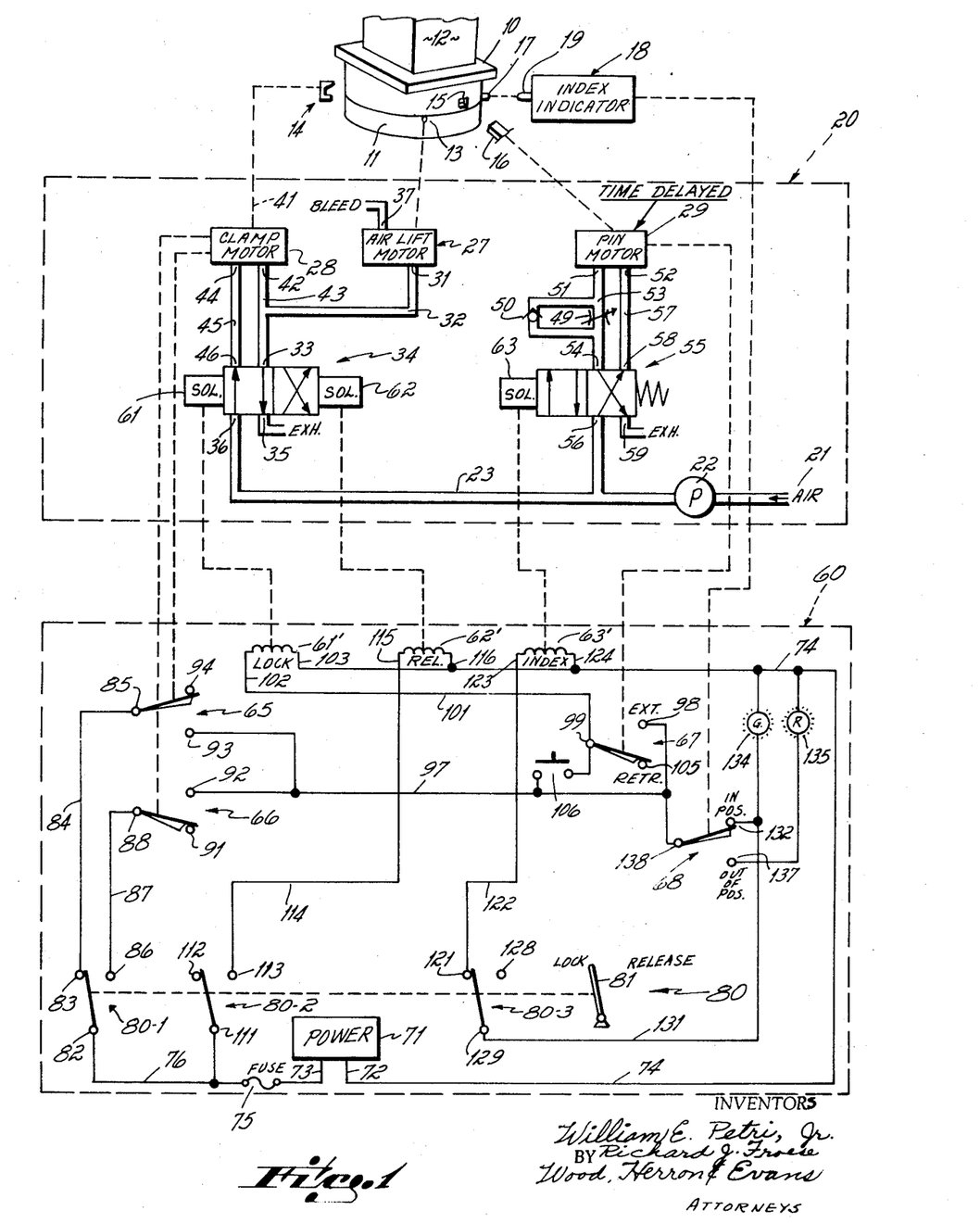
FIG. 1 is a diagrammatic illustration of an index table together with pneumatic and electrical schematics of the control system therefore, according to the present invention.

Referring to FIG. 1, an index table 10 is rotatably supported upon a stationary base 11 and is adapted to fixedly support a workpiece 12 upon its upper horizontal surface. The base 11 is provided with a plurality of pneumatic bearings 13. The table 10 normally rests on the upper surface of the base 11 and is non-rotatable due to the friction of the surface. When the air lift bearings 13 are actuated, the table 10 is lifted away from the base 11 to become released for rotatable movement with respect to the base 11. A table clamp 14 is supported upon the base 11 and is adapted to selectively clamp the table 10 to the base 11 to lock it to the base 11 in the event that torque applied to the workpiece would be great enough to overcome the friction between the table and base when the air lift is de-actuated.

The table 10 is also provided with a plurality of notches 15, each notch defining a different one of a set of discrete index positions of the table. The notches 15 are spaced at equal intervals around the periphery of the table 10. An index pin 16 is carried by an assembly supported on the base 11. The pin 16 is movable radially toward and away from the table 10. The index pin 16 is positioned in a horizontal plane of the notches 15 so that when one of the notches 15 is adjacent the pin 16 the pin can be extended into the notch 15. A plurality of cam surfaces 17, one corresponding to each of the notches 15, are spaced about the circumference of the table 10.

An index indicator 18 is positioned stationary with respect to the base 11 and adjacent to table 10. The indicator 18 includes a cam follower 19 positioned in the horizontal plane of the cam surfaces 17 and in the path thereof so that as any one of the cams 17 is moved to a position in radial alignment with the follower 19, a switch within the housing of the indicator 18 will be closed. The closing of the switch provides a means to signal that the table 10 is registered at an index position, and that the pin 16 is in alignment with one of the notches 15 in the periphery of the table 10.

The air lift bearings 13, the clamp 14, and the index pin 16 are operated and controlled by a pneumatic circuit 20. The pneumatic circuit 20 includes an air source 21 connected to the input of a pump or compressor 22 which supplies air at high pressure to an air pressure line 23. The pneumatic circuit 20 has three mechanical outputs represented by three pneumatic motors which include: an air lift 27 which elevates the bearings 13, a clamp motor 28 which actuates the clamp 14, and the index pin drive motor 29 which actuates the index pin 16. The air lift 27 has an input port 31 connected through a pneumatic line 32 to an output port 33 of a double solenoid controlled four way valve 34. When the table 10 is to be in the locked condition, this port will be connected to atmospheric pressure at the exhaust port 35. When the table is to be in the released condition, this port 33 will be connected to a high pressure port 36 which is connected to the high pressure line 23. When the valve 34 is in this position, high pressure is communicated to the air lift motor 27 along line 32 causing air lift motor 27 to elevate the bearings 13, thereby lifting the table 10 for rotary movement upon the base 11. The air entering the input port 31 of the air lift motor 27 will bleed off through the assembly of the bearing 13. (This bleeding is represented only diagrammatically by a bleed port 37 in the diagram of FIG. 1. The bearing construction will be explained in more detail in connection with the discussion of FIG. 2 below.) When the valve 34 is in the table lock position, the high pressure is removed from the input port 31 of the air lift motor 27 and the pneumatic pressure is thus removed from the air bearings 13 causing the table 10 to descend under its own weight to rest against the upper surface of the base 11.

The clamp motor 28 is a pneumatic motor having an output shaft 41 drivably connected to the clamp mechanism 14. The clamp motor 28 has a first input port 42 connected through the pneumatic line 43 to the output port 33 of the valve 34. The clamp motor 28 has a second input port 44 connected through the line 45 to an output 46 of the valve 34. When the valve 34 is in the table lock position, high pressure is communicated through the valve 34 to the output port 46, and through the line 45 to the input port 44 of the clamp motor 28 actuating the motor and clamping the table 10 to the base 11. It should be noted that when the valve is in this position the air lift is de-actuated and the table 10 is resting upon base 11. When the valve 34 is in the table release position, the port 46 is connected to exhaust port 35 of the valve 34 while high pressure is communicated to the output port 33 of the valve 34 and along line 43 to the input port 42 of the clamp motor 28, de-actuating the clamp 14 and unclamping the table 10 from the base 11. Again it is noted that when the valve 34 is in this position the air lift motor 27 is actuated and the table is lifted and rotatable upon the base 11.

The index pin drive motor 29 is provided with a pair of input ports 51 and 52. The port 51 is connected through a pneumatic line 53 to an output port 54 of a four way valve 55. The valve 55 is a single solenoid controlled four way valve. The output port 54 is normally connected to an exhaust port 59 which communicates with the atmosphere. Similarly, the input port 52 of the motor 29 is connected through line 57 to an output port 58 of the valve 55. The output port 58 normally communicates with the high pressure input port 56 which is in turn connected to the high pressure air line 23. When the valve 55 is in this normal position, the index pin 16 is retracted. When the valve 55 is energized, the input port 51 of the index pin motor 29 is connected to high pressure while the input port 52 of the motor 29 is vented to atmosphere. In this position the index pin 16 is extended to engage one of the notches 15 of the table 10. Provided in the line 53 are a variable flow control valve 49 and a check valve 50 connected across the flow control valve 49. This provides a means to variably control the rate at which the pin 16 extends and to thus predetermine the minimum period of time during which the valve 55 must be actuated in order that the pin 16 be fully extended. The purpose of this is explained more fully below.

The pneumatic circuit 20 and the index table assembly have together seven interfaces with an electrical control circuit 60. These interfaces include a table lock solenoid 61 and the table release solenoid, 62, which drive the double solenoid controlled four way valve 34 to operate the air lift motor 27, clamp motor 28, and the index pin solenoid 63 which operates the single solenoid controlled four way valve 55 to actuate the index pin drive motor 29. The seven interfaces also include four limit switches. These limit switches include two clamp limit switches 65 and 66 which are mechanically actuated by the respective clamped and unclamped conditions of the clamp motor 28. A limit switch 67 is provided to indicate the status of the index pin 16, and it is actuated mechanically by the index pin drive motor 29 when the pin 16 is extended. A limit switch 68 is provided within the housing of the indicator 18. This switch 68 is actuated when the table is in an indexed position.

The electrical control circuit 60 includes a power source 71 having a pair of output terminals 72 and 73. The output 72 is connected to common line 74. The output 73 is connected through a fuse 75 to a power lead 76. A control switch 80 includes three ganged switch sections 80–1, 80–2 and 80–3 each controlled by the control lever 81. The switch 80 is operable to condition the circuit 60 to lock and to release the table 10. The switch 80 is illustrated in FIG. 1 to be in the table lock condition.

The switch section 80–1 includes a common terminal 82 connected to the power lead 76, a terminal 83 connected through a lead 84 to the common terminal 85 of the "clamped" limit switch 65, and a terminal 86 connected through a lead 87 to the common terminal 88 of the "unclamped" limit switch 66. The limit switch 66 has an unused normally closed contact 91 and a normally opened contact 92 which is connected to the normally closed contact 93 of the limit switch 65. The limit switch 65 has an unused normally opened contact 94. The contacts 92 and 93 are connected to lead 97 which is connected to the normally opened contact 98 of the index pin limit switch 67. The limit switch 67 has an unused normally closed contact 105. The common terminal 99 of the limit switch 67 is connected through lead 101 to one lead 102 of the winding 61' of the valve solenoid to 61. The other terminal 103 of the winding 61' is connected to the common power line 74. Connected across the terminals 98 and 99 and the limit switch 67 is a normally opened push button switch 106 which is provided in the event that it is desired to lock the table in a position other than an indexed position.

The switch section 80–2 includes a common terminal 111 connected to the power lead 76, an unused terminal 112, and a terminal 113 connected through line 114 to one terminal 115 of the winding 62' of the valve solenoid 62. The other terminal 116 of the winding 62' is connected to the common power lead 74.

The switch section 80–3 is provided with a terminal 121 connected through lead 122 to a terminal 123 of the winding 63' of the valve solenoid 63. The other terminal 124 of the winding 63' is connected to the common power lead 74. The switch section 80–3 is also provided with an unused terminal 128 and a common terminal 129 which is connected to lead 131 which is, in turn, connected to the normally opened contact 132 of the limit switch 68. Connected between the contact 132 and the common power lead 74 is an "in-position" indicator light 134. An "out-of-position" indicator light 135 is connected between the common power lead 74 and the normally closed contact 137 of the limit switch 68. The limit switch 68 has a common terminal 138 which is connected to the line 97.

Figures 2, 3:
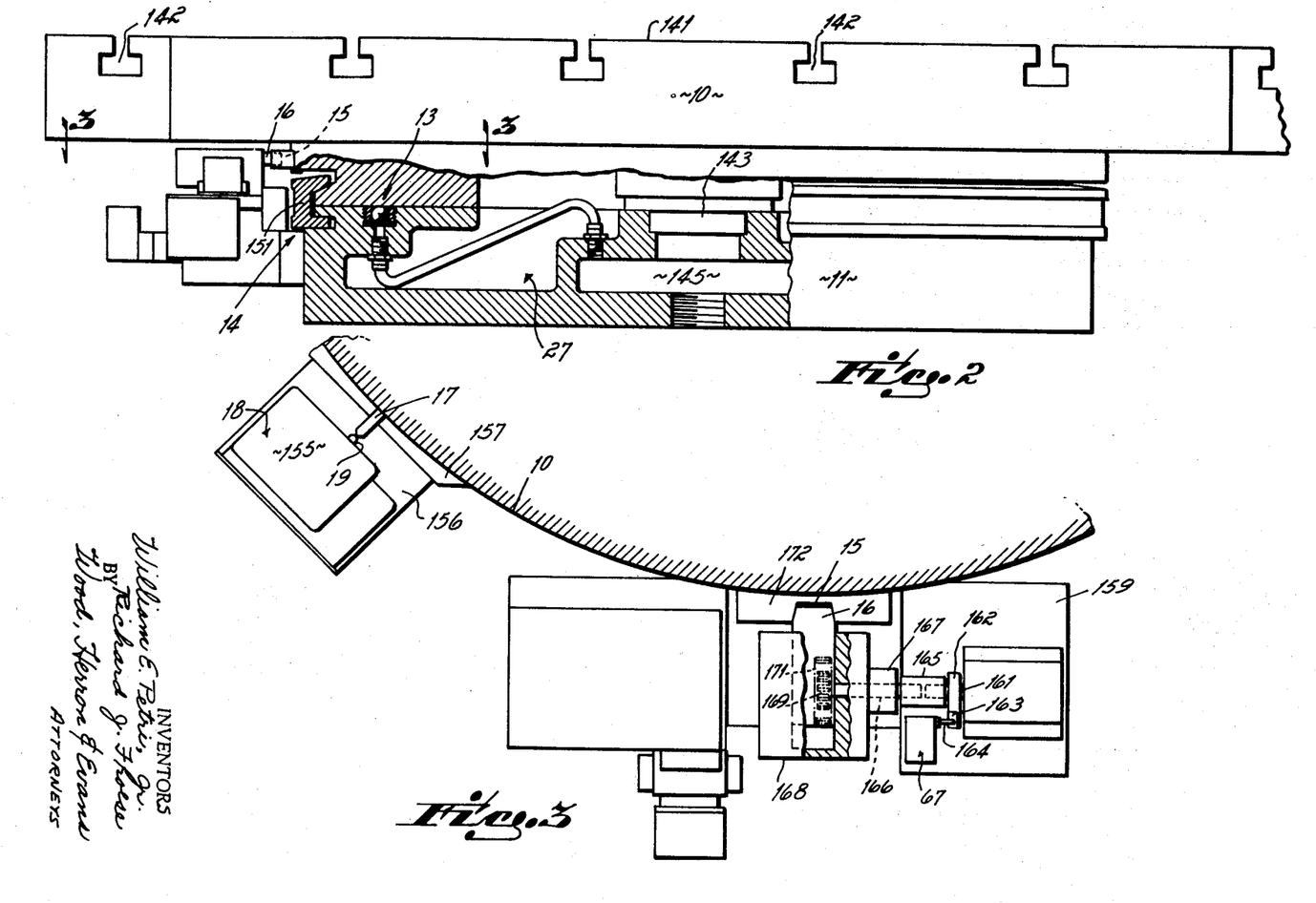
FIG. 2 is an elevation view, partially cut away, of an index table of FIG. 1 illustrating particularly the table mount and air lift assembly.
FIG. 3 is a cross sectional view along line 3—3 of FIG. 2 illustrating particularly the index switch assembly and the index pin mechanism.

Turning now to the mechanical details of the index table, reference is made to FIG. 2. The table 10 is provided with an upper workpiece supporting surface 141 having a plurality of keyways 142 therein. The keyways 142 provide means for fixedly constraining a workpiece to the surface 141. The table 10 is rotatably supported upon the base 11 at a vertical center shaft 143. A plurality of, for example, twelve of the air bearings 13 are provided at equally spaced intervals in a circle concentric about the shaft 143 and in the upper surface of the support 11. The bearings 13 are elevated to lift the table 10 by air pressure communicated through the air lift motor assembly 27 which communicates pressure to the region below each of the bearings 13. The air lift 27 is provided with a manifold 145 which communicates with high pressure through the input port 31. (The details of the air lift and table construction are fully described and illustrated also in U.S. Pat. No. 3,042,460, July 3, 1962, of C.E. Gilbert, Sr. et al. for Slide Bearing Construction.) The table and mount are provided with the clamp 14 which takes the form of a retaining ring 151 that surrounds corresponding flanges of the table 10 and base 11. The clamp 14 for clamping the table to the support is conventional in the art and is only diagrammatically illustrated (FIG. 1).

The mechanical arrangement of the index indicator 18, the index pin 16, and index pin drive motor assembly 29 are best illustrated in FIG. 3. The index table 10 has, rigidly projecting from the circumference thereof, the index cams 17, one of which is illustrated in index position in FIG. 3. When in index position, the cam 17 deflects the index indicator cam follower 19 to actuate the index switch 68 (FIG. 1) which is contained within the housing 155 of the index indicator 18. The housing 155 is supported on a support 156 which is rigidly connected to a bracket 157 mounted upon the base 11. The index pin 16 and pin drive motor assembly 29 are similarly rigidly mounted upon a support 159 attached to the base 11. Rigidly mounted to the shaft 161 is a cam 162. The cam 162 has a switch actuating surface 163. The limit switch 67 is rigidly mounted to the bracket 159 and has its actuator arm 164 extending into the path of the cam surface 163. When the index pin 16 is in its extended condition, the cam surface 163 is in engagement with the actuator 164, thereby actuating the limit switch 67 to signal that the index pin 16 is in its extended condition. The shaft 161 is connected through a shaft coupling sleeve 165 to one end of a pinion shaft 166 rotatably supported by a bearing 167 mounted on one side of a pin housing 168 which is in turn rigidly supported by the bracket 159. The other end of the shaft 166 has mounted to it a pinion 169 which is positioned in driving engagement with a rack 171 mounted upon the index pin 16 which is slideably supported by the housing 168. Rotary actuation of the motor 29 turns the shaft 161, the coupling 165, the pinion shaft 166, and the pinion 169 which drives the index pin into or out of the notch 15. The notches 15 are each formed in an index block 172 rigidly mounted on the circumference of the table 10.

The design of the motor 29, the drive linkage connecting the motor 29 with the index pin 16, and the pneumatic circuitry providing motive fluid to the motor 29 contribute an important aspect to the present invention. A time delay feature is built into this linkage which is controllable through the variable flow control valve 49. This time delay provides that the pin 16 will seat in the notch 15 only at some predetermined delayed time after the actuation of the valve 55. It is this time delay which causes the pin to extend only when the cam 17 is in registration with the cam follower 19 for a period of time of a predetermined minimum duration.

The operation of the control, when the apparatus is used according to the method of the present invention, is herein described with reference to FIG. 1 which illustrates the table 10 in a locked indexed condition. Initially, the table 10 is stationary and locked in position by combined action of the clamp 14, which is actuated, and the air lift 13, which is de-actuated. The index pin 16, however, is retracted. The switch 80 is set to the lock position. The limit switch 65 is actuated because the clamp 14 is actuated, while the limit switch 66 is de-actuated. The limit switch 68 is actuated because the indicator cam 17 is in alignment with the cam follower 19. While the green "in position" light 134 is connected to the line 97, neither of the lights 134 or 135 is illuminated, because there is no power on lead 97.

When an index change is desired, the operator switches the switch 80 to the release position. This immediately causes the solenoid 62 to energize, which causes the valve 34 to shift, which actuates the air lift 27 and causes the clamp 14 to release. The releasing of the clamp causes the limit switch 66 to actuate applying electrical power to the line 97. This causes the green light 134 to illuminate since the table is in an indexed condition. The operator then nudges the table and imparts to it a slight rotational movement. This causes the cam 17 to disengage the cam follower 19 of the indicator 18 causing the switch 68 to de-actuate, extinguishing the green light 134 and illuminating the red "out-of-position" light 135.

At this point, it is possible for the operator to rotate the table to the desired index position at which the green light would then again be illuminated. The operator could then stop the table in this position so that the green light remains on and then move the switch lever 81 to the lock position. At this point the mechanism would go through a locking cycle in which the solenoid 63 would be energized causing the index pin 16 to seat in a notch 15, causing the switch 67 to actuate and thereby energize the solenoid 61, de-actuating the air lift and actuating the clamp. However, the primary advantage of the present invention, and the use of the described control which has been discovered to be highly useful, lies in the procedure which is described as follows:

During this procedure, the operator moves the table while monitoring the index signal as displayed by the indicator lights.

After the table has been rotated slightly from its index position so that now the red light is illuminated, the operator then switches the switch 80 to the lock position. Because the table is unclamped, power is present on line 97 through the switch 65, and the red light 135 is illuminated. The operator then rotates the table past the undesired index positions. During this rotation the limit switch 68 is momentarily closed as each index position is passed and the green light will blink on for a brief instant. Simultaneous with the blinking of the light, the solenoid 63 is momentarily energized switching the valve 55 for the same brief instant. However, this instant of time is too short to cause the index pin motor to drive the index pin completely into the notch 15. Therefore, the table is not locked and will continue to rotate past these undesired index positions. When the operator has moved the table close to the desired index position, he slows the rotation of the table so that the switch 68 is actuated for a sustained period of time, a period of time sufficient to allow the index pin 16 to become completely driven into the notch 15 by the motor 29, conveniently set by adjustment of the valve 49 to be approximately 1 second. When the pin has so engaged the notch 15, the switch 67 is actuated, and solenoid 61 is energized. This causes the air lift 27 to be turned off, and the clamp motor 28 to be actuated, and the table to be locked in the desired index position. As the clamp actuates, the limit switch 65 is actuated removing power from line 97 to extinguish the indicator lights and to de-energize the solenoid 63. This causes the valve 55 to shift under the influence of a bias spring to cause the index pin 16 to retract. During this preferred method of operation, the operator has selected and moved the table to the desired index position without the requirement of removing his hands or diverting his attention from the movement of the index table to manually actuate the lock switch.

While the period of one second is not critical, it is found that a period of in the order of one second is convenient to prevent unwanted actuation at undesired index positions, but permitting actuation at the desired index position without requiring too great an effort in positioning the table. It is to be understood that the equivalent of this time selection can be achieved varying other design parameters. This is particularly true since the normal speed of a table being moved past undesired index positions is dependent upon the mass of the table and workpiece and the friction of the bearings supporting the table. The ability to slow the table from this normal speed at a desired index position is also dependent upon these factors. In addition, the type and design of the indicator which generates the index signal also affects the timing, as does the spacing of the index positions. While the one second duration was found convenient in the specific application discussed in connection with large boring mills, convenient periods can be easily determined, from the present discussion, for other situations by those skilled in art through simple experimentation with the valve 49.

It should be noted that the specific control system is particularly well suited for index tables of the air lift type. The time delay feature which is built into the index pin drive motor 29 can be easily varied by adjusting the restriction valve 49 in the air line 53 to the motor 29. Because pneumatic elements are employed, the readily available air source which is required for the air lift is utilized. Therefore, the need to employ electrical or mechanical time delay mechanisms is avoided.

While certain specific advantages are provided by the preferred embodiment of the present invention described above, the broad concepts provided by the apparatus and method of the present invention are set forth in the following claims.

What is claimed is:

1. In a rotary indexing table assembly: a stationary base, a work supporting table rotatably mounted upon said base and movable to a plurality of index orientations with respect to said base, selectively operable locking means for immobilizing said table on said base when said locking means is actuated, and the improvement comprising:

indexing means and control means operable in combination to selectively actuate said locking means at a selected one of said plurality of index orientations in response to the speed at which said table is moved at said locations;

said indexing means being operable to produce an index signal when said table is in any one of said index orientations, the duration of said index signal being related to the speed of said table;

said control means being operable to actuate said locking means in response to an index signal of a predetermined minimum duration;

said table being movable past said index orientations at a first speed to cause an index signal to be produced having a duration less than said predetermined minimum duration; and said table being movable near said index orientations at a second speed less than said first speed to produce an index signal having a duration at least as great as said predetermined minimum duration.

2. In a rotary indexing table assembly: a stationary base, a work supporting table rotatably mounted upon said base and movable to a plurality of index orientations with respect to said base, selectively operable locking means for immobilizing said table on said base when said locking means is actuated, and the improvement comprising:

indexing means for producing an index signal when said table is in any one of said index orientations, the duration of said index signal being related to the speed of said table;

control means for actuating said locking means in response to an index signal of a predetermined minimum duration;

said table being movable past said index orientations at a first speed to cause an index signal to be produced having a duration less than said predetermined minimum duration; and said table being movable near said index orientations at a second speed less than said first speed to produce an index signal having a duration at least as great as said predetermined minimum duration;

said indexing means including:

a plurality of cam surfaces spaced about the circumference of said table, an index indicator mounted on said base and having an actuator positioned in the path of said cam surfaces, and said indicator being effective to produce said index signal when said index indicator actuator is in alignment with any one of said cam surfaces.

3. An improvement according to claim 2 further comprising:

an index pin moveably mounted on said base;

said table having a plurality of notches spaced about the circumference thereof;

said notches being positioned such that one of said notches is adjacent said pin when any one of said cams is in alignment with said index actuator; and said pin being operable to extend into said one of said notches when actuated.

4. An improvement according to claim 3 wherein:
said control means includes
 1. motive means for
  a. de-actuating said locking means in response to a first signal, and
  b. actuating said locking means in response to a second signal; and
 2. means for producing said first and second signals.

5. An improvement according to claim 4 wherein:
said signal producing means are electrical means and include:
 a. a control switch having a lock condition and a release condition,
 b. first circuit means for generating said first signal when said control switch is in said release condition,
 c. second circuit means for conditioning said electrical means, when said control switch is in said lock condition, to generate said second signal in response to a delay signal; and
said control means further comprises means for producing said delay signal in response to an index signal of said predetermined minimum duration.

6. An improvement according to claim 5 wherein:
said control means includes motive means effective to actuate said index pin in response to a third signal; and
said electrical means includes
third circuit means for generating said third signal in response to said index signal from said index indicator when said control switch is in said lock condition.

7. An improvement according to claim 6 wherein:
said delay signal generating means includes said index pin motive means,
said index pin motive means being effective to extend said index pin in response to said third signal of a predetermined minimum duration.

8. An improvement according to claim 7 wherein:
said delay signal producing means includes
an index pin limit switch for generating said delay signal when said pin is extended.

9. An improvement according to claim 6 wherein:
said indicator includes a limit switch for generating said index signal, said index signal being an electrical index signal.

10. An improvement according to claim 5 wherein:
said control switch is a manually actuatable switch.

11. An improvement according to claim 1 further comprising:
an index pin moveably mounted on said base;
said table having a plurality of notches spaced about the circumference thereof; and
said pin being operable to extend into said one of said notches when actuated.

12. An improvement according to claim 11 wherein:
said control means includes
 1. motive means for
  a. de-actuating said locking means in response to a first signal, and
  b. actuating said locking means in response to a second signal; and
 2. means for producing said first and second signals.

13. An improvement according to claim 12 wherein:
said signal producing means are electrical means and include:
 a. a control switch having a lock condition and a release condition,
 b. first circuit means for generating said first signal when said control switch is in said release condition,
 c. second circuit means for conditioning said electrical means, when said control switch is in said lock condition, to generate said second signal in response to a delay signal; and
said control means further comprises means for producing said delay signal in response to an index signal of said predetermined minimum duration.

14. An improvement according to claim 13 wherein:

said control means includes motive means effective to actuate said index pin in response to a third signal; and said electrical means includes third circuit means for generating said third signal in response to said index signal when said control switch is in said lock condition.

15. In a rotary indexing table assembly: a stationary base, a work supporting table rotatably mounted upon said base and movable to a plurality of index orientations with respect to said base, selectively operable locking means for immobilizing said table on said base when said locking means is actuated, and the improvement comprising:

indexing means for producing an index signal when said table is in any one of said index orientations, the duration of said index signal being related to the speed of said table;

control means for actuating said locking means in response to an index signal of a predetermined minimum duration;

said table being movable past said index orientations at a first speed to cause an index signal to be produced having a duration less than said predetermined minimum duration; and said table being movable near said index orientations at a second speed less than said first speed to produce an index signal having a duration at least as great as said predetermined minimum duration;

an index pin movably mounted on said base;

said table having a plurality of notches spaced about the circumference thereof; and said pin being operable to extend into said one of said notches when actuated;

said control means including:

1. motive means for
  a. de-actuating said locking means in response to a first signal, and
  b. actuating said locking means in response to a second signal; and
2. means for producing said first and second signals;

said signal producing means are electrical means and including:

a. a control switch having a lock condition and a release condition, b. first circuit means for generating said first signal when said control switch is in said release condition, c. second circuit means for conditioning said electrical means, when said control switch is in said lock condition, to generate said second signal in response to a delay signal;

said control means further comprising means for producing said delay signal in response to an index signal of said predetermined minimum duration;

said control means including motive means effective to actuate said index pin in response to a third signal;

said electrical means including third circuit means for generating said third signal in response to said index signal when said control switch is in said lock condition;

said delay signal generating means including said index pin motive means, and said index pin motive means being effective to extend said index pin in response to a third signal of a predetermined minimum duration.

16. An improvement according to claim 15 wherein: said delay signal producing means includes an index pin limit switch for generating said delay signal when said pin is extended.

17. An improvement according to claim 13 wherein: said control switch is a manually actuatable switch.

18. An improvement according to claim 1 wherein: said control means includes 1. motive means for
  a. de-actuating said locking means in response to a first signal, and
  b. actuating said locking means in response to a second signal; and
2. means for producing said first and second signals.

19. An improvement according to claim 18 wherein: said signal producing means are electrical means and include:

a. a control switch having a lock condition and a release condition, b. first circuit means for generating said first signal when said control switch is in said release condition, c. second circuit means for conditioning said electrical means, when said control switch is in said lock condition, to generate said second signal in response to a delay signal; and said control means further comprises means for producing said delay signal in response to an index signal of said predetermined minimum duration.

20. An improvement according to claim 1 wherein: said control means includes 1. electrical means including
  a. a control switch having a lock condition and a release condition,
  b. first circuit means for de-actuating said locking means when said control switch is in said release condition,
  c. second circuit means for conditioning said electrical means, when said control switch is in said lock condition, to actuate said locking means in response to a delay signal; and
2. means for producing said delay signal in response to an index signal of said predetermined minimum duration.

21. In a rotary indexing table assembly: a stationary base, a work supporting table rotatably mounted upon said base and movable to a plurality of index orientations with respect to said base, selectively operable locking means for immobilizing said table on said base when said locking means is actuated, and the improvement wherein said locking means includes a selectively operable clamp for clamping said table to said base, when said clamp is actuated to lock said table to said base, comprising:

indexing means for producing an index signal when said table is in any one of said index orientations, the duration of said index signal being related to the speed of said table;

control means for actuating said locking means in response to an index signal of a predetermined minimum duration;

said table being movable past said index orientations at a first speed to cause an index signal to be produced having a duration less than said predetermined minimum duration; and said table being movable near said index orientations at a second speed less than said first speed to produce an index signal having a duration at least as great as said predetermined minimum duration;

said control means being effective to actuate said clamp in response to said index signal of predetermined minimum duration; and said control means including
1. motive means for
   a. de-actuating said clamp in response to a first signal, and
   b. actuating said locking means in response to a second signal; and
2. means for producing said first and second signals.

22. An improvement according to claim 1, in a rotary index table wherein said locking means includes selectively operable bearing means for reducing the friction between said table and said base when said bearing means are actuated to release said table from said base, wherein:
said control means is effective to de-actuate said bearing means in response to said index signal of predetermined minimum duration.

23. In a rotary indexing table assembly; a stationary base, a work supporting table rotatably mounted upon said base and movable to a plurality of index orientations with respect to said base, selectively operable locking means for immobilizing said table on said base when said locking means is actuated, and the improvement wherein said locking means includes selectively operable bearing means for reducing the friction between said table and said base when said bearing means are actuated to release said table from said base and a selectively operable clamp for clamping said table to said base when said clamp is actuated to lock said table to said base, comprising:
indexing means for producing an index signal when said table is in any one of said index orientations, the duration of said index signal being related to the speed of said table;
control means for actuating said locking means in response to an index signal of a predetermined minimum duration;
said table being movable past said index orientations at a first speed to cause an index signal to be produced having a duration less than said predetermined minimum duration; and
said table moving movable near said index orientations at a second speed less than said first speed to produce an index signal having a duration at least as great as said predetermined minimum duration;
said control means being effective to de-actuate said bearing means in response to said index signal of predetermined minimum duration; and
said control means being effective to actuate said clamp in response to said index signal of predetermined minimum duration.

24. An improvement according to claim 23 wherein:
said control means includes
1. fluid motive means for
   a. actuating said bearing means and de-actuating said clamp in response to a first signal, and
   b. de-actuating said bearing means and actuating said clamp in response to a second signal; and
2. means for producing said first and second signals, including fluid controlled delay means for measuring the duration of said index signal and timing the production of said second signal.

25. An improvement according to claim 22, in a rotary index table assembly wherein said bearing means is an air lift for lifting said table from said base, wherein:
said control means includes
1. pneumatic motive means for
   a. actuating said air lift in response to a first signal, and
   b. de-actuating said air lift in response to a second signal, and
2. means for producing said first and second signals, including pneumatic delay means for measuring the duration of said index signal and timing the production of said second signal.

26. An improvement according to claim 25 wherein:
said delay means includes a flow control valve.

27. An improvement according to claim 25 further comprising:
an index pin movably mounted on said base;
said table having a plurality of notches spaced about the circumference thereof;
said notches being positioned such that one of said notches is adjacent said pin when said table is in alignment with said index orientations;
said pin being operable to extend into said one of said notches when actuated; and
a pneumatic pin drive motor operative to drive said index pin toward an extended position in response to a third signal.

28. An improvement according to claim 27 wherein:
said delay means comprises:
a. means for producing a delay signal in response to the extended position of said index pin:
b. a flow control valve connected pneumatically in series with said pin drive motor for controlling the rate of extension of said pin.

29. An improvement according to claim 28 wherein:
said signal producing means are electrical means and include:
a. a control switch having a lock condition and a release condition,
b. first circuit means for generating said first signal when said control switch is in said release condition,
c. second circuit means for conditioning said electrical means, when said control switch is in said lock condition, to generate said second signal in response to said delay signal; and
d. third circuit means for generating said third signal in response to said index signal from said indexing means when said control switch is in said lock condition.

30. An improvement according to claim 29 wherein:
said delay signal producing means includes
an index pin limit switch for generating said delay signal when said pin is extended.

31. An improvement according to claim 1 wherein said minimum duration is in the order of 1 second.

32. An improvement according to claim 1 wherein the control means further comprises means for varying said predetermined minimum duration for setting it at some optimum value.

33. In an indexing table assembly: a stationary base, a work supporting table movably mounted upon said base and movable to a plurality of index positions with respect to said base, selectively operable locking means for immobilizing said table on said base when said locking means is actuated, and the improvement comprising:
   indexing means for producing an index signal when said table is in any one of the said index positions, the duration of said signal being related to the speed at which said table is being moved when at any one of said positions;
   control means for actuating said locking means to lock said table in response to an index signal when said signal is of at least a predetermined minimum duration; and
   said control means being inoperable to actuate said locking means to allow continued movement of said table when said signal is of less than said predetermined minimum duration.

34. A method of repositioning an indexable table in an indexing table assembly having a stationary base, said table being movably mounted upon said base and movable to a plurality of index positions with respect to said base, selectively operable locking means for immobilizing said table on said base when said locking means is actuated; said method comprising the steps of:
   releasing said locking means;
   conditioning said locking means to actuate in response to an index signal of a predetermined minimum duration;
   moving said table on said base from an initial position to a desired index position;
   generating an index signal while said table is within a given range of any one of said index positions; and
   during said moving step, selecting the desired one of said plurality of index positions which include said desired index positions and at least one undesired index position by:
   a. maintaining said table in any undesired index position for a period of time less than said predetermined minimum duration of said index signal, and
   b. maintaining said table in said desired index position for a period of time greater than or equal to said predetermined minimum duration of said index signal;
   whereby said locking means is actuated to immobilize said table only at said desired index position in response to the time at which said table is maintained at said position.

35. A method according to claim 34 wherein said table is rotatably mounted on said base, and wherein said moving step comprises:
   rotating said table on said base from said initial position to said desired index position.

36. A method of repositioning in indexable table in an indexing table assembly having a stationary base, said table being movably mounted upon said base and movable to a plurality of index positions with respect to said base, selectively operable locking means for immobilizing said table on said base when said locking means is actuated, indexing means for producing an index signal while said table is within a given range of any one of said index positions, and control means operable when conditioned to actuate said locking means in response to an index signal of a predetermined minimum duration; said method comprising the steps of:
   conditioning said control means; then moving said table on said base from an initial position to a desired index position; and
   during said moving step, selecting the desired one of said plurality of index positions which include said desired index positions and at least one undesired index position by:
   a. maintaining said table in any undesired index position for a period of time less than said predetermined minimum duration of said index signal, and
   b. maintaining said table in said desired index position for a period of time greater than or equal to said predetermined minimum duration of said index signal;
   whereby said locking means is actuated to immobilize said table only at said desired index position in response to the time at which said table is maintained at said position.

37. A method according to claim 36 further comprising the steps of:
   monitoring said index signal and the approximate relative position of said table relative to said base; and
   controlling said moving step in accordance with information derived from said monitoring step.

38. A method according to claim 37 wherein said table is rotatably mounted on said base, and wherein said moving step comprises:
   rotating said table on said base from said initial position to said desired index position.

39. A method according to claim 36 wherein said duration is in the order of one second.

40. A method according to claim 34 wherein said duration is in the order of one second.

* * * * *